United States Patent
Hagemeyer et al.

(10) Patent No.: US 9,617,187 B2
(45) Date of Patent: *Apr. 11, 2017

(54) CATALYST SUPPORT, PROCESS FOR ITS PREPARATION AND USE

(75) Inventors: Alfred Hagemeyer, Bad Aibling (DE); Karl-Heinz Hable, Vilsbiburg (DE); Alice Kyriopoulos, Holzkirchen (DE); Peter Scheck, Gliching (DE); Rudolf Kerscher, Ergoldsbach (DE); Ernst Haberkorn, Moosburg (DE)

(73) Assignee: SUD-Chemie AG, Munich (DE)

( * ) Notice: Subject to any disclaimer, the term of this patent is extended or adjusted under 35 U.S.C. 154(b) by 303 days.

This patent is subject to a terminal disclaimer.

(21) Appl. No.: 13/129,915

(22) PCT Filed: Nov. 27, 2009

(86) PCT No.: PCT/EP2009/008469
§ 371 (c)(1),
(2), (4) Date: Sep. 19, 2011

(87) PCT Pub. No.: WO2010/060637
PCT Pub. Date: Jun. 3, 2010

(65) Prior Publication Data
US 2011/0319655 A1    Dec. 29, 2011

(30) Foreign Application Priority Data
Nov. 30, 2008  (DE) ........................ 10 2008 059 341

(51) Int. Cl.
*C07C 67/00*    (2006.01)
*B01J 21/16*    (2006.01)
(Continued)

(52) U.S. Cl.
CPC ............. *C04B 33/04* (2013.01); *B01J 21/066* (2013.01); *B01J 21/16* (2013.01); *B01J 23/00* (2013.01);
(Continued)

(58) Field of Classification Search
CPC ...... B01J 21/066; B01J 21/16; B01J 35/1014; B01J 35/1038; B01J 35/1042;
(Continued)

(56) References Cited

U.S. PATENT DOCUMENTS 2,656,323 A    10/1953  Bielawski et al.
3,252,757 A    5/1966   Granquist
(Continued)

FOREIGN PATENT DOCUMENTS

CA    1267880    4/1990
CA    1267882    4/1990
(Continued)

OTHER PUBLICATIONS

Figueroa (Hyperfine Study on Sol-gel Derived-Hematite Doped zirconia, Chem. Mater., 2005, 17:3486-3491).*
(Continued)

*Primary Examiner* — Jun Li
(74) *Attorney, Agent, or Firm* — RatnerPrestia

(57) ABSTRACT

An open-pore catalyst support comprising a material that comprises a natural sheet silicate and $ZrO_2$. In order to provide a catalyst support, by means of which alkenyl acetate catalysts can be prepared which are characterized by a high level of alkenyl acetate activity over a relatively long period, the catalyst support comprises a material that comprises a natural sheet silicate and $ZrO_2$ in the tetragonal modification.

45 Claims, 5 Drawing Sheets

(51) Int. Cl.

| | |
|---|---|
| *C04B 33/04* | (2006.01) |
| *B01J 21/06* | (2006.01) |
| *B01J 23/00* | (2006.01) |
| *B01J 35/08* | (2006.01) |
| *B01J 35/10* | (2006.01) |
| *B01J 37/00* | (2006.01) |
| *C04B 35/626* | (2006.01) |
| *C04B 38/00* | (2006.01) |
| *C04B 111/00* | (2006.01) |

(52) U.S. Cl.
CPC ............ *B01J 35/08* (2013.01); *B01J 35/108* (2013.01); *B01J 35/1019* (2013.01); *B01J 35/1038* (2013.01); *B01J 35/1061* (2013.01); *B01J 37/0018* (2013.01); *C04B 35/62675* (2013.01); *C04B 38/0022* (2013.01); *C04B 2111/0081* (2013.01); *C04B 2235/3244* (2013.01); *C04B 2235/44* (2013.01); *C04B 2235/441* (2013.01); *C04B 2235/5436* (2013.01); *C04B 2235/765* (2013.01); *C04B 2235/94* (2013.01)

(58) Field of Classification Search
CPC ... B01J 35/1061; B01J 37/0018; C04B 33/04; C04B 35/62675; C04B 38/0022; C04B 38/0054; C04B 38/0058; C04B 38/0074; C04B 2235/3244; C04B 2235/765; C04B 2235/5436; C04B 2111/0081
USPC ........................................................ 502/439
See application file for complete search history.

(56) References Cited

U.S. PATENT DOCUMENTS

| | | | |
|---|---|---|---|
| 3,259,589 A | 7/1966 | Michalko | |
| 3,565,919 A | 2/1971 | Friedrichsen et al. | |
| 3,617,489 A | 11/1971 | Csicsery | |
| 3,962,135 A | 6/1976 | Alafandi | |
| 4,155,730 A | 5/1979 | Biberbach et al. | |
| 4,407,733 A | 10/1983 | Birkenstock et al. | |
| 4,409,410 A | 10/1983 | Cosyns et al. | |
| 4,521,618 A | 6/1985 | Arntz et al. | |
| 4,621,072 A | 11/1986 | Arntz et al. | |
| 4,844,790 A | 7/1989 | Occelli | |
| 4,970,804 A | 11/1990 | Hüttlin | |
| 4,977,126 A | 12/1990 | Mauldin et al. | |
| 4,990,266 A | 2/1991 | Vorlop et al. | |
| 5,015,453 A | 5/1991 | Chapman | |
| 5,066,365 A | 11/1991 | Roscher et al. | |
| 5,145,650 A | 9/1992 | Hüttlin | |
| 5,175,136 A | 12/1992 | Felthouse | |
| 5,179,056 A | 1/1993 | Bartley | |
| 5,189,123 A | 2/1993 | Gropper et al. | |
| 5,213,771 A | 5/1993 | Hilliard et al. | |
| 5,248,644 A | 9/1993 | Johnson et al. | |
| 5,250,487 A | 10/1993 | Wirtz et al. | |
| 5,304,525 A | 4/1994 | Immel et al. | |
| 5,369,069 A | 11/1994 | Suzuki | |
| 5,422,329 A | 6/1995 | Wirtz | |
| 5,559,071 A | 9/1996 | Abel | |
| 5,567,839 A | 10/1996 | Gulliver et al. | |
| 5,571,771 A | 11/1996 | Abel | |
| 5,591,688 A | 1/1997 | Blum et al. | |
| 5,622,908 A | 4/1997 | Abel | |
| 5,648,576 A | 7/1997 | Nguyen Than et al. | |
| 5,650,371 A * | 7/1997 | Culross ........................ 502/305 |
| 5,665,667 A | 9/1997 | Lemanski et al. | |
| 5,668,074 A | 9/1997 | Wu et al. | |
| 5,700,753 A | 12/1997 | Wang et al. | |
| 5,753,583 A | 5/1998 | Heineke et al. | |
| 5,801,285 A | 9/1998 | Waldmann et al. | |
| 5,808,136 A | 9/1998 | Tacke | |
| 5,888,472 A | 3/1999 | Bem et al. | |
| 5,935,889 A | 8/1999 | Murrell et al. | |
| 5,990,344 A | 11/1999 | Couves | |
| 6,015,769 A | 1/2000 | Wang | |
| 6,017,847 A | 1/2000 | Wang | |
| 6,074,979 A | 6/2000 | Hagemeyer et al. | |
| 6,090,746 A | 7/2000 | Bönnemann et al. | |
| 6,156,927 A | 12/2000 | Halcom et al. | |
| 6,207,610 B1 | 3/2001 | Krause et al. | |
| 6,228,800 B1 | 5/2001 | Yamaguchi et al. | |
| 6,268,522 B1 | 7/2001 | Hagemeyer et al. | |
| 6,288,295 B1 | 9/2001 | Didillon et al. | |
| 6,313,063 B1 | 11/2001 | Rytter et al. | |
| 6,316,383 B1 | 11/2001 | Tacke et al. | |
| 6,350,717 B1 | 2/2002 | Frenzel et al. | |
| 6,350,900 B1 | 2/2002 | Wang et al. | |
| 6,358,882 B1 | 3/2002 | Salem et al. | |
| 6,367,165 B1 | 4/2002 | Hüttlin | |
| 6,395,676 B2 | 5/2002 | Blum et al. | |
| 6,399,813 B1 | 6/2002 | Blum et al. | |
| 6,420,308 B1 | 7/2002 | Khammamedova | |
| 6,486,093 B2 | 11/2002 | Wang et al. | |
| 6,492,299 B1 | 12/2002 | Couves et al. | |
| 6,528,453 B2 | 3/2003 | Baker et al. | |
| 6,528,683 B1 | 3/2003 | Heidemann et al. | |
| 6,534,438 B1 | 3/2003 | Baker et al. | |
| 6,534,672 B2 | 3/2003 | Salem et al. | |
| 6,593,270 B1 | 7/2003 | Krause et al. | |
| 6,603,038 B1 | 8/2003 | Hagemeyer et al. | |
| 6,605,739 B1 | 8/2003 | Karim et al. | |
| 6,734,131 B2 | 5/2004 | Shih et al. | |
| 6,797,669 B2 | 9/2004 | Zhang et al. | |
| 6,806,382 B2 | 10/2004 | Baker et al. | |
| 6,821,922 B1 | 11/2004 | Tacke et al. | |
| 6,849,243 B1 | 2/2005 | Hagemeyer | |
| 6,898,869 B2 | 5/2005 | Hüttlin | |
| 6,949,141 B2 | 9/2005 | Hüttlin | |
| 6,987,200 B2 | 1/2006 | Hagemeyer et al. | |
| 6,992,040 B2 | 1/2006 | Müller et al. | |
| 7,288,686 B2 | 10/2007 | Ryu | |
| 7,468,455 B2 | 12/2008 | Mazanec et al. | |
| 7,569,508 B2 | 8/2009 | Zhou et al. | |
| 7,797,854 B2 | 9/2010 | Huettlin | |
| 8,207,327 B2 | 6/2012 | Laar et al. | |
| 2001/0018401 A1 | 8/2001 | Blum et al. | |
| 2001/0048970 A1 | 12/2001 | Hagemeyer et al. | |
| 2002/0028966 A1 | 3/2002 | Blum et al. | |
| 2002/0052290 A1 | 5/2002 | Bowman et al. | |
| 2002/0062039 A1 | 5/2002 | Salem et al. | |
| 2003/0003035 A1 | 1/2003 | Stamires et al. | |
| 2003/0036476 A1 | 2/2003 | Arnold et al. | |
| 2003/0047586 A1 * | 3/2003 | Shibasaki et al. ............ 228/101 |
| 2003/0144544 A1 | 7/2003 | Baker et al. | |
| 2003/0187293 A1 | 10/2003 | Birke et al. | |
| 2003/0187294 A1 | 10/2003 | Hagemeyer et al. | |
| 2003/0195114 A1 | 10/2003 | Tacke et al. | |
| 2003/0233012 A1 | 12/2003 | Jackson et al. | |
| 2004/0048937 A1 | 3/2004 | Srinivasan et al. | |
| 2004/0235650 A1 | 11/2004 | Saleh et al. | |
| 2005/0034322 A1 | 2/2005 | Hüttlin | |
| 2005/0181940 A1 | 8/2005 | Wang et al. | |
| 2005/0203320 A1 | 9/2005 | Ryu | |
| 2006/0035780 A1 | 2/2006 | Xu | |
| 2006/0135809 A1 * | 6/2006 | Kimmich et al. ............ 560/241 |
| 2006/0266673 A1 | 11/2006 | Rende et al. | |
| 2007/0041795 A1 | 2/2007 | Neto et al. | |
| 2007/0135302 A1 | 6/2007 | Neto et al. | |
| 2007/0191651 A1 | 8/2007 | Coupard et al. | |
| 2007/0234586 A1 | 10/2007 | Huettlin | |
| 2008/0287290 A1 | 11/2008 | Wang et al. | |
| 2009/0305882 A1 * | 12/2009 | Dahar et al. ................. 502/303 |
| 2010/0140181 A1 | 6/2010 | Tastayre | |
| 2010/0185010 A1 | 7/2010 | Hagemeyer | |
| 2010/0222209 A1 | 9/2010 | Kashani-Shirazi et al. | |
| 2011/0017289 A1 | 1/2011 | Park et al. | |

(56) References Cited

U.S. PATENT DOCUMENTS

| | | |
|---|---|---|
| 2011/0166010 A1 | 7/2011 | Hagemeyer et al. |
| 2012/0279556 A1 | 11/2012 | Choi |

FOREIGN PATENT DOCUMENTS

| | | |
|---|---|---|
| CA | 1268018 | 4/1990 |
| CA | 1268165 | 4/1990 |
| CA | 2 338 961 A1 | 2/2000 |
| CA | 2612435 | 12/2006 |
| CN | 1929916 A | 3/2007 |
| DE | 1 286 021 B1 | 1/1969 |
| DE | 27 03 801 A1 | 8/1978 |
| DE | 28 48 978 A1 | 5/1980 |
| DE | 29 45 913 A1 | 6/1981 |
| DE | 31 19 850 A1 | 2/1982 |
| DE | 261 104 A5 | 10/1988 |
| DE | 40 06 935 A1 | 9/1991 |
| DE | 40 39 026 A1 | 6/1992 |
| DE | 4405876 | 10/1995 |
| DE | 44 43 705 A1 | 6/1996 |
| DE | 195 34 493 A1 | 3/1997 |
| DE | 195 38 799 A1 | 4/1997 |
| DE | 196 01 861 A1 | 7/1997 |
| DE | 197 34 974 A1 | 2/1999 |
| DE | 197 34 975 A1 | 3/1999 |
| DE | 198 34 569 A1 | 2/2000 |
| DE | 199 04 147 A1 | 8/2000 |
| DE | 199 14 066 A1 | 10/2000 |
| DE | 100 64 084 A1 | 7/2002 |
| DE | 697 11 320 T2 | 7/2002 |
| DE | 102 48 116 B3 | 4/2004 |
| DE | 602 06 752 T2 | 7/2006 |
| DE | 20 2005 003 791 U1 | 8/2006 |
| DE | 10 2005 029 200 A1 | 12/2006 |
| DE | 102007025223 | 12/2008 |
| DE | 102007025443 | 12/2008 |
| EP | 0 064 301 A1 | 11/1982 |
| EP | 0 262 962 A2 | 4/1988 |
| EP | 0370 167 A1 | 5/1990 |
| EP | 0 436 787 A2 | 7/1991 |
| EP | 0565952 | 10/1993 |
| EP | 0634208 | 1/1995 |
| EP | 0634209 | 1/1995 |
| EP | 0634214 | 1/1995 |
| EP | 0 723 810 A1 | 7/1996 |
| EP | 0 839 797 A1 | 5/1998 |
| EP | 0839793 | 5/1998 |
| EP | 0 882 507 A1 | 12/1998 |
| EP | 0 899 013 A1 | 3/1999 |
| EP | 1 102 635 | 2/2000 |
| EP | 1 323 469 A2 | 7/2003 |
| EP | 1 452 230 A1 | 9/2004 |
| EP | 1 979 073 | 7/2007 |
| GB | 585571 | 2/1947 |
| GB | 1 229 749 A1 | 4/1971 |
| GB | 1 258 371 | 12/1971 |
| GB | 1 283 737 | 8/1972 |
| JP | 6-48724 | 2/1994 |
| JP | 2003-527962 | 9/2003 |
| JP | 2005246197 | 9/2005 |
| JP | 2006-239588 | 9/2006 |
| JP | 2006-255600 | 9/2006 |
| JP | 2007-506540 | 3/2007 |
| JP | 2011-501691 | 1/2011 |
| KR | 1996-0000019 | 5/1988 |
| KR | 10-2006-0103514 | 10/2006 |
| KR | 10-2011-0047714 A | 5/2011 |
| WO | WO 98/14274 A1 | 4/1998 |
| WO | 9818553 | 5/1998 |
| WO | WO 98/37102 A1 | 8/1998 |
| WO | WO 99/22860 A1 | 5/1999 |
| WO | WO 99/62632 A1 | 12/1999 |
| WO | 0058008 | 10/2000 |
| WO | WO 02/100527 A1 | 12/2002 |
| WO | 2005061107 | 7/2005 |
| WO | 2005065821 | 7/2005 |
| WO | WO 2005/061107 A1 | 7/2005 |
| WO | WO 2005/065821 A1 | 7/2005 |
| WO | WO 2006/027009 A1 | 3/2006 |
| WO | WO 2006/045606 A1 | 5/2006 |
| WO | WO 2006/078926 A1 | 7/2006 |
| WO | WO 2008/107050 | 9/2008 |

OTHER PUBLICATIONS

Chinese Search Report for Application No. 200980147978.8 dated Jun. 2013.
Stauffer, D. et al., Introduction to Percolation Theory, 2nd Edition, Taylor and Fransis, London, 1994.
Römpp Chemical Dictionary, 10th Edition, Georg Thieme Verlag, at pp. 374-375.
Römpp Chemical Dictionary, 10th Edition, Georg Thieme Verlag, at pp. 3427-3428.
International Search Report of PCT/EP2009/008469 filed Nov. 27, 2009, mailed Apr. 28, 2010.
Elliott P. Barrett et al., "The Determination of Pore Volume and Area Distributions in Porous Substances. I. Computations from Nitrogen Isotherms," J. Am. Chem. Soc., vol. 73, 1951, pp. 373-380.
Stephen Brunauer et al., "Adsorption of Gases in Multimolecular Layers," J. Am. Chem. Soc., vol. 60, 1938, pp. 309-319.
Kohl et al., Gas purification, 5th Edition, Gulf Publishing Company (1997) pp. 40-50.
Komai et al., Journal of Catalysis 120, 370-376 (1989).
L.A. Boot et al., Characterization of Pre-shaped Zirconia Bodies for Catalytic Applications, Journal of Material Science, vol. 31, 1996, pp. 3115-3121.
Lehrbuch de anorganischen Chemie, Hollemann Wiberg, de Gruyter 102, Auflage, 2007 (ISBN 978-3-11-017770-1), pp. 955-970, term Schichtsllkate.
Römpp Chemical Dictionary, 10th Edition (1997), Georg Thieme Verlag, at pp. 374-375.
Römpp Chemical Dictionary, 10th Edition (1997), Georg Thieme Verlag, at pp. 3427-3428.
Reddy et al., Fluor's Econamine FG Plus Technology, presented at the Second National Conference on Carbon Sequestration, National Energy Technology Department of Energy, Alexandria, VA, USE, May 5-8, 2003.
Textbook of Inorganic Chemistry, Hollemann Wiberg, de Gruyter, 102nd Edition, 2007 (ISBN 978-3-11-017770-1), at pp. 955-959, 965-970.
Usubharatana et al., Energy Procedia, vol. 1, Issue 1, Feb. 2009, pp. 95-102.
Montmorillonite, Mineral Data Publishing, Version 1.2 (2001).
IN248153, Huttlin et al., Published Jun. 24, 2011, English language equivalent of WO2006/027009.

* cited by examiner

US 9,617,187 B2

CATALYST SUPPORT, PROCESS FOR ITS PREPARATION AND USE

CROSS REFERENCE TO RELATED APPLICATIONS

This is a National Phase application of PCT application number PCT/EP2009/008469, filed Nov. 27, 2009, which claims priority benefit of German application number DE 10 2008 059 341.9, filed Nov. 30, 2008, the content of such applications being incorporated herein by reference.

FIELD OF THE INVENTION

The present invention relates to an open-pore catalyst support consisting of a material which comprises a natural sheet silicate and $ZrO_2$.

BACKGROUND OF THE INVENTION

Alkenyl acetates are an important monomer building block in the synthesis of plastic polymers. The main fields of use of alkenyl acetates are i.a. the preparation of polyvinyl acetate, polyvinyl alcohol and polyvinyl acetal and also co- and terpolymerization with other monomers such as for example ethylene, vinyl chloride, acrylate, maleinate, fumarate and vinyl laurate.

Alkenyl acetates are prepared for example in the gas phase from acetic acid and ethylene by reaction with oxygen, wherein the catalysts used for this synthesis preferably contain Pd as active metal, Au as promoter and an alkali metal component as co-promoter, preferably potassium in the form of the acetate. In the Pd/Au system of these catalysts, the metals Pd and Au are not present in the form of metal particles of the respective pure metal, but rather in the form of Pd/Au-alloy particles of possibly different composition, although the presence of unalloyed particles cannot be ruled out. As an alternative to Au, for example Cd or Ba can also be used as co-promoter.

Currently, alkenyl acetates are predominantly prepared by means of so-called shell catalysts in which the noble metals Pd and Au do not fully penetrate the catalyst support formed as a shaped body, but rather are contained only in an outer area (shell) of greater or lesser width of the catalyst support shaped body (cf. on this EP 565 952 A1, EP 634 214 A1, EP 634 209 A1 and EP 634 208 A1), while the areas of the catalyst support lying further inside are free of noble metals. With the help of shell catalysts, a more selective reaction control is possible in many cases than with catalysts in which the supports are impregnated into the core of the support with active component ("impregnated through").

The shell catalysts known in the state of the art for the preparation of alkenyl acetates can be for example catalyst supports based on silicon oxide, aluminium oxide, aluminosilicate, titanium oxide or zirconium oxide (cf. on this EP 839 793 A1, WO 1998/018553 A1, WO 2000/058008 A1 and WO 2005/061107 A1). Catalyst supports based on titanium oxide or zirconium oxide are currently scarcely used, however, since these catalyst supports display no long-term resistance to acetic acid and are relatively expensive. In the case of shell catalysts coated with Zr suspension, problems with the abrasion resistance and mechanical stability arise.

The great majority of the catalysts currently used for the preparation of alkenyl acetates are shell catalysts with a Pd/Au shell on a porous amorphous aluminosilicate support formed as a sphere based on natural sheet silicates which are impregnated through with potassium acetate as co-promoter.

Such alkenyl acetate shell catalysts are usually prepared by the so-called chemical route in which the catalyst support is [steeped in] solutions of corresponding metal precursor compounds, for example by dipping the support into the solutions, or by means of the incipient wetness method (pore-filling method) in which the support is loaded with a volume of solution corresponding to its pore volume.

The Pd/Au shell of the catalyst is produced for example by first steeping the catalyst support in a first step in a Pd salt solution and then in a second step fixing the Pd component with a base, e.g. NaOH, onto the catalyst support in the form of a Pd-hydroxide compound. In a subsequent, separate third step, the catalyst support is then steeped in an Au-salt solution and then the Au component is likewise fixed by means of a base. After the fixing of the noble-metal components in the outer shell of the catalyst support, the support is washed, then dried, optionally calcined and finally reduced. The thus-produced Pd/Au shell is usually approximately 100 μm to 500 μm thick.

Usually, the catalyst support loaded with the noble metals is loaded with potassium acetate after the last fixing or reducing step wherein, rather than the loading with potassium acetate taking place only in the outer shell loaded with noble metals, the catalyst support is completely impregnated through with the co-promoter. A spherical support called "KA-160" from SÜD-Chemie AG, Munich, Germany, based on a natural sheet silicate, which has a BET surface area of approximately 160 $m^2$/g, is predominantly used as catalyst support.

The alkenyl acetate selectivities achieved by means of the shell catalysts known in the state of the art based on Pd and Au and also KA-160 supports are approximately 90 mol-%, relative to the supplied ethylene, wherein the remaining 10 mol-% of the reaction products are essentially $CO_2$ which is formed by total oxidation of the organic educts/products.

To increase the activity of alkenyl acetate catalysts, before the deposition of the noble metal, catalyst supports free of active metal, based on natural sheet silicates, are first surface-doped with zirconium cations. For this, for example ready-formed catalyst support shaped bodies are impregnated with a solution of a zirconium salt compound and then calcined. Although, compared with the corresponding catalysts without zirconium doping, such catalysts are characterized by increased activity with respect to alkenyl acetate production, the increased activity is not of long duration, as because of the corrosive atmosphere in alkenyl acetate synthesis the Zr is released relatively rapidly from the catalyst support and is therefore no longer available for activation of the catalyst. The zirconium applied by impregnation is not sufficiently resistant to acetic acid under process conditions even after the calcining of a modified support.

DESCRIPTION OF THE INVENTION

The object of the present invention is therefore to provide a catalyst support, by means of which alkenyl acetate catalysts can be prepared which are characterized by a relatively high level of alkenyl acetate activity over a relatively long period.

This object is achieved by a first open-pore catalyst support consisting of a material which comprises a natural sheet silicate and $ZrO_2$ in the tetragonal modification.

Surprisingly, it was discovered that, by means of an open-pore catalyst support consisting of a material which comprises a natural sheet silicate and $ZrO_2$, wherein the $ZrO_2$ is present in the tetragonal modification, alkenyl acetate catalysts can be prepared, which are characterized by a relatively high level of alkenyl acetate activity over a relatively long period.

$ZrO_2$ occurs in three modifications. $ZrO_2$ is present in the monoclinic modification at room temperature, in the tetragonal modification at a temperature above 1170° C. and in the cubic modification above 2370° C. up to the melting point at 2690° C.

In the catalyst support according to aspects of the invention the high-temperature tetragonal modification of the $ZrO_2$ is stable at room temperature.

According to a preferred embodiment of the first catalyst support according to aspects of the invention it is provided that the catalyst support in boiling acetic acid releases less than 0.06 wt.-% Zr calculated as $ZrO_2$, relative to the weight of the $ZrO_2$ contained in the catalyst support.

It was found that the solubility in acetic acid of the $ZrO_2$ contained in the first catalyst support according to aspects of the invention is relatively low and the catalyst support therefore loses little $ZrO_2$, with the result that relatively little $ZrO_2$ needs to be contained in the catalyst support in order to maintain the increased activity of a corresponding catalyst over a relatively long period. It was also possible to show that by means of the process according to aspects of the invention for the preparation of the catalyst support according to aspects of the invention, supports can be obtained which have $ZrO_2$ which is only 0.05 wt.-% to 0.0001 wt.-% soluble in boiling acetic acid, relative to the weight of the $ZrO_2$ contained in the catalyst support. Accordingly, according to a preferred embodiment of the first catalyst support according to aspects of the invention, it is provided that the catalyst support releases less than 0.06 wt.-% Zr in boiling acetic acid calculated as $ZrO_2$, relative to the weight of the $ZrO_2$ contained in the catalyst support, preferably 0.05 wt.-% to 0.0001 wt.-%, more preferably 0.01 wt.-% to 0.0003 wt.-%, still more preferably 0.008 wt.-% to 0.0005 wt.-% and further preferably 0.003 wt.-% to 0.0008 wt.-%.

In order to determine the Zr release of the catalyst support according to aspects of the invention 10 g of the dry catalyst support in powder form is boiled in 250 ml of 96% boiling acetic acid (pro analysi) for 1 h at normal pressure under reflux conditions. The catalyst support is then separated via a filter, the filtrate evaporated until dry and the mass of the remaining solid residue determined. This residue, by comparison with the quantity of catalyst support used, provides information on how soluble the catalyst support is in acetic acid. The zirconium content of the solid residue is determined by means of Inductively Coupled Plasma (ICP) and from this the quantity of Zr released from the catalyst support is calculated as $ZrO_2$. It is assumed that all the zirconium contained in the support is present as zirconium dioxide. The quantities of sample and agents used for determining the support's solubility in acetic acid can if required be scaled up, in each case by the same factor, in order to achieve greater accuracy.

The total zirconium content of the catalyst support is determined by means of suitable information and ICP-analysis and from this the total zirconium dioxide content of the support is calculated. It is assumed that all the zirconium contained in the support is present as zirconium dioxide. The Zr release of the catalyst support in boiling acetic acid (calculated as $ZrO_2$) relative to the total quantity of $ZrO_2$ contained in the catalyst support is calculated as follows:

Zr release of the catalyst support (calculated as $ZrO_2$ release) [wt.-%]=(Zr released from the sample (calculated as $ZrO_2$)[g]/(total zirconium dioxide content of the sample [%] * mass of the catalyst support sample [g])*100 wt.-%. For example: 10 g of catalyst support with a Zr content of 7.40 wt.-% (corresponding to 10 g of $ZrO_2$) are treated in acetic acid. 0.074 g of Zr is detected in the eluate. The Zr release is calculated as (0.074 g*(123.223)/91.224))/10 g=0.1%.

The present invention further relates to a second catalyst support which achieves the abovementioned object. This second open-pore catalyst support consisting of a material which comprises a natural sheet silicate and $ZrO_2$, wherein the catalyst support in boiling acetic acid releases less than 0.06 wt.-% Zr calculated as $ZrO_2$, relative to the weight of the $ZrO_2$ contained in the catalyst support.

The $ZrO_2$ contained in the second catalyst support according to aspects of the invention has a relatively low solubility in acetic acid, with the result that relatively little $ZrO_2$ needs to be contained in the catalyst support in order to maintain the increased activity of a corresponding alkenyl acetate catalyst over a relatively long period. It was also possible to show that by means of the process according to aspects of the invention for the preparation of the catalyst support according to aspects of the invention, supports can be obtained which have $ZrO_2$ which is only 0.05 wt.-% to 0.0001 wt.-% soluble in boiling acetic acid, relative to the weight of the $ZrO_2$ contained in the catalyst support. Accordingly it is provided that the second catalyst support according to aspects of the invention releases less than 0.06 wt.-% Zr in boiling acetic acid calculated as $ZrO_2$, relative to the weight of the $ZrO_2$ contained in the catalyst support, preferably 0.05 wt.-% to 0.0001 wt.-%, more preferably 0.01 wt.-% to 0.0003 wt.-%, still more preferably 0.008 wt.-% to 0.0005 wt.-% and further preferably 0.003 wt.-% to 0.0008 wt.-%. The Zr release in acetic acid is determined as explained above.

The following preferred embodiments of the catalyst support according to aspects of the invention relate to both the first and the second catalyst support according to aspects of the invention.

According to a preferred embodiment of the catalyst support according to aspects of the invention, it is provided that at least 50 wt.-% of the $ZrO_2$ contained in the catalyst support is present in the tetragonal modification. As the proportion of the $ZrO_2$ with tetragonal modification contained in the catalyst support according to aspects of the invention is determined by means of X-ray diffractometry (XRD), said proportion refers only to X-ray diffraction active $ZrO_2$ which is contained in the catalyst support according to aspects of the invention.

According to aspects of the invention it is preferred that at least 50 wt.-% of the $ZrO_2$ contained in the catalyst support according to aspects of the invention is X-ray diffraction active, preferably at least 70 wt.-%, more preferably at least 80 wt.-%, still more preferably at least 90 wt.-% and further preferably at least 95 wt.-%.

A relatively large proportion of the $ZrO_2$ contained in the catalyst support according to aspects of the invention is present in the tetragonal modification. Tetragonal zirconium dioxide has a relatively high specific surface area. However, the phase stable at room temperature is monoclinic zirconium dioxide which has a relatively low specific surface area. Surprisingly, by simply incorporating undoped zirconium hydroxide into a support matrix comprising a sheet silicate followed by calcining, the surface-rich tetragonal $ZrO_2$ phase was successfully produced in a high yield and stabilized. Thus, a relatively high zirconium dioxide specific surface area is provided in the catalyst support according to aspects of the invention using relatively little expensive zirconium. The catalyst support known from the state of the art which is prepared by impregnating a catalyst support with a zirconium salt solution followed by calcining is X-ray amorphous as regards the zirconium. This normally means that the zirconium is present in the form of nanocrystalline particles and/or in amorphous form.

Accordingly, it is provided according to a further preferred embodiment of the catalyst support according to aspects of the invention that at least 50 wt.-% of the $ZrO_2$ contained in the catalyst support according to aspects of the invention is present in the tetragonal modification, preferably 50 wt.-% to 100 wt.-%, more preferably 70 wt.-% to 99 wt.-%, still more preferably 85 wt.-% to 98 wt.-%, further preferably 90 wt.-% to 97 wt.-%, further preferably 92 wt.-% to 96 wt.-% and still further preferably 93 wt.-% to 95 wt.-%. The above proportions again relate to the X-ray diffraction active $ZrO_2$ contained in the support. A proportion of 100 wt.-% of tetragonal $ZrO_2$, which is particularly preferred according to aspects of the invention, means that only signals from tetragonal $ZrO_2$ can be identified in a corresponding XRD spectrum and no signals from $ZrO_2$ of monoclinic or cubic modification.

According to a further preferred embodiment of the catalyst support according to aspects of the invention, it is provided that in an XRD spectrum of the support the ratio of the intensity of the signal at 2 theta of 28.2° to the intensity of the signal at 2 theta of 30.2° is less than/equal to 1, preferably less than 0.5, preferably less than 0.3, still more preferably less than 0.05 and still further preferably equal to 0. It is furthermore preferred that the XRD spectrum of the support is free of signals from cubic $ZrO_2$. The peak of greatest intensity (hkl 111) of monoclinic $ZrO_2$ lies at 2 theta of 28.2°, the peak of greatest intensity (hkl 101) of tetragonal $ZrO_2$ lies at 2 theta of 30.2°. The XRD spectrum is a so-called XRD-difference spectrum. The XRD difference spectrum is generated by having an XRD spectrum of a catalyst support according to aspects of the invention and a reference catalyst support recorded under identical conditions and subtracting the XRD spectrum of the reference catalyst support from that of the catalyst support according to aspects of the invention. The reference catalyst support is prepared analogously to the catalyst support according to aspects of the invention, with the exception that Zr is not added to the reference catalyst support. The XRD spectra are preferably measured on an X-ray powder diffractometer from Bruker AXS, model D4 ENDEAVOR, in Bragg-Brentano geometry. The device parameters are preferably: Cu $K_{alpha}$ 1.5406 Å, current voltage 40 kV, current strength 40 mA and the scan parameters are: continuous scan, 2 theta of 5° to 90°, step size=0.03° 2 theta, time per step=0.5 s, divergence slit=12 mm variable, anti-scatter slit=12 mm variable, sample rotation: 30 rpm.

According to a further preferred embodiment of the catalyst support according to aspects of the invention, it is provided that the $ZrO_2$ is present in particulate form.

If $ZrO_2$ is present in the catalyst support according to aspects of the invention in the tetragonal modification, the $ZrO_2$ is contained in the support in particulate form. Otherwise, the $ZrO_2$ can in principle also be contained in the support in the form of individual $ZrO_2$ units which are incorporated for example into the framework structure of the material. But it is preferred that the $ZrO_2$ is present in the catalyst support according to aspects of the invention in particulate form. A stable incorporation of the $ZrO_2$ in the material and thus a largely low solubility in acetic acid (Zr release) of the $ZrO_2$ contained in the catalyst support is thereby ensured.

If the $ZrO_2$ is contained in the catalyst support according to aspects of the invention in particulate form, it is provided according to a further preferred embodiment of the catalyst support according to aspects of the invention that the $ZrO_2$ has an average particle diameter $d_{50}$ of at most 50 µm, preferably an average particle diameter $d_{50}$ of at most 30 µm and further preferably an average particle diameter $d_{50}$ of at most 20 µm. The average particle diameter $d_{50}$ is determined by element distribution by means of electron microscopy (SEM/EDX). For this, the maximum dimensions of the 50 largest identifiable $ZrO_2$ particles in a 1 mm×1 mm area selected at random, but representative of an EDX spectrum of the catalyst support, are measured and the $d_{50}$ value calculated from them. The EDX measurement preferably takes place on a LEO 1530VP scanning electron microscope equipped with an energy-dispersive spectrometer from Bruker AXS. For the measurement, the catalyst support is cut through, and glued to a graphite sample holder. A nitrogen-free silicon drift chamber detector (XFlash® 4010) with an energy resolution of 129 eV for the manganese $K_{alpha}$ line at 130 kcps is preferably used as detector.

According to a further preferred embodiment of the catalyst support according to aspects of the invention, it is provided that the $ZrO_2$ is contained statistically evenly distributed in the material.

It was found that the more evenly distributed the $ZrO_2$ contained in the matrix of the support, the greater the achievable mechanical stability of the catalyst support. It was also found that catalyst supports with even distribution of the $ZrO_2$, not only as spheres but also in the form of hollow cylinders or trilobes, have good mechanical stability. According to a further preferred embodiment of the catalyst support according to aspects of the invention, it is therefore provided that the $ZrO_2$ is contained evenly distributed, preferably homogeneously or statistically evenly distributed, in the material.

According to a further preferred embodiment of the catalyst support according to aspects of the invention, it is provided that the $ZrO_2$ is contained in the catalyst support in a proportion of 1 wt.-% to 30 wt.-%, relative to the weight of the catalyst support.

If $ZrO_2$ is contained in the catalyst support in a proportion of less than 1 wt.-%, the alkenyl acetate activity of a corresponding catalyst according to aspects of the invention is increased only slightly, while above a proportion of 30 wt.-% the increase in the activity of the catalyst can be accompanied by a noticeable loss of alkenyl acetate selectivity. Accordingly, it is provided according to a further preferred embodiment of the catalyst support according to aspects of the invention that the $ZrO_2$ is contained in the catalyst support in a proportion of 1 wt.-% to 30 wt.-%, relative to the weight of the catalyst support, preferably in a proportion of 5 wt.-% to 20 wt.-% and further preferably in a proportion of 8 wt.-% to 15 wt.-%.

According to a further preferred embodiment of the catalyst support according to aspects of the invention it is provided that the $ZrO_2$ particles are contained evenly distributed in the support and the support is free or essentially free of a percolation network of $ZrO_2$ particles.

According to a further preferred embodiment of the catalyst support according to aspects of the invention it is provided that the $ZrO_2$ particles are evenly distributed over the cross-section of the support and that the support is free or essentially free of a percolation network of $ZrO_2$ particles.

In the catalyst support according to aspects of the invention the $ZrO_2$ content is preferably chosen according to the particle size of the resulting $ZrO_2$ particles in the support such that the percolation threshold in the support matrix is not reached. As is clear for example from the following EDX photographs, the $ZrO_2$ particles are essentially present as discrete units, not linked with each other and statistically evenly distributed in the support matrix. By percolation threshold within the meaning of percolation theory (see Stauffer D. and Aharony A.: *Introduction to Percolation Theory*, Taylor and Francis, London, 1994) is meant any threshold relating to the concentration of $ZrO_2$ in the catalyst support, wherein for the first time a three-dimensional $ZrO_2$ network passes completely through the support. It is assumed that when the percolation threshold is exceeded during impregnation of a corresponding support with metal salt solutions, the diffusion runs into the support matrix along the $ZrO_2$ units, which leads to a higher or more uneven introduction of metal salt solution into the support core and thus hinders the formation of shell catalysts.

A natural sheet silicate is contained in the catalyst support according to aspects of the invention. By "natural sheet silicate", for which the term "phyllosilicate" is also used in the literature, is meant within the framework of the present invention untreated or treated silicate mineral from natural sources, in which $SiO_4$ tetrahedra, which form the structural base unit of all silicates, are cross-linked with each other in layers of the general formula $[Si_2O_5]^{2-}$. These tetrahedron layers alternate with so-called octahedron layers in which a cation, principally Al and Mg, is octahedrally surrounded by OH or O. A distinction is drawn for example between two-layer phyllosilicates and three-layer phyllosilicates. Sheet silicates preferred within the framework of the present invention are clay minerals, in particular kaolinite, beidellite, hectorite, saponite, nontronite, mica, vermiculite and smectites, wherein smectites and in particular montmorillonite are particularly preferred. Definitions of the term "sheet silicates" are to be found for example in "Lehrbuch der anorganischen Chemie", Hollemann Wiberg, de Gruyter, $102^{nd}$ edition, 2007 (ISBN 978-3-11-017770-1) or in "Römpp Lexikon Chemie", $10^{th}$ edition, Georg Thieme Verlag under the headword "Phyllosilikat".

Typical treatments to which a natural sheet silicate is subjected before use as support material include in particular a treatment with acids, in particular mineral acids such as for example hydrochloric acid, and/or calcining.

A natural sheet silicate particularly preferred within aspects of the framework of the present invention is montmorillonite, which is preferably used in the form of a bentonite. Bentonites are mixtures of different clay minerals which contain as predominant component montmorillonite (approximately 50 wt.-% to 90 wt.-%). Further accompanying minerals can be i.a. quartz, mica and feldspar.

According to a further preferred embodiment of the catalyst support according to aspects of the invention, it is provided that the natural sheet silicate is an acid-activated sheet silicate.

Acid-activated sheet silicates are known in the state of the art (cf. Römpp Lexikon Chemie, $10^{th}$ edition, Georg Thieme Verlag, headword "Bentonite"). In order to increase the adsorption force of the catalyst support according to aspects of the invention, the natural sheet silicate is preferably present in the support in the form of an acid-activated sheet silicate. It is further preferred that the acid-activated sheet silicate is acid-activated montmorillonite which according to aspects of the invention is further preferably contained in the support according to aspects of the invention in the form of an acid-activated bentonite.

According to a further preferred embodiment of the catalyst support according to aspects of the invention, it is provided that the catalyst support has an acidity of 1 μval/g to 150 μval/g.

The degree of acidity of the catalyst support according to aspects of the invention can, at least indirectly, advantageously influence the performance of a corresponding catalyst with regard to the gas-phase synthesis of alkenyl acetates from acetic acid and ethene. According to a further preferred embodiment of the catalyst support according to aspects of the invention, it is therefore provided that the catalyst support has an acidity of 1 μval/g to 150 μval/g, preferably an acidity of 5 μval/g to 130 μval/g, preferably an acidity of 10 μval/g to 100 μval/g and particularly preferably an acidity of 20 μval/g to 60 μval/g. The acidity of the support can for example be increased by impregnating the support with acid.

The acidity of a catalyst support is determined as follows: 100 ml water (with a pH blank value) is added to 1 g of the finely ground catalyst support and extraction carried out for 15 minutes accompanied by stirring. Titration to at least pH 7.0 with 0.01 n NaOH solution follows, wherein the titration is carried out in stages; 1 ml of the NaOH solution is firstly added dropwise to the extract (1 drop/second), followed by a 2-minute wait, the pH is read, a further 1 ml NaOH added dropwise, etc. The blank value of the water used is determined and the acidity calculation corrected accordingly. The titration curve (ml 0.01 NaOH against pH) is then plotted and the intersection point of the titration curve at pH 7 determined. The mole equivalents which result from the NaOH consumption for the intersection point at pH 7 are calculated in $10^{-6}$ equiv/g support:

$$\text{Total acid: } \frac{10 * \text{ml } 0.01n \text{ NaOH}}{1 \text{ Support}} = \mu\text{val/g}$$

According to a further preferred embodiment of the catalyst support according to aspects of the invention, it is provided that the catalyst support has an average pore diameter of 8 nm to 30 nm.

To keep the pore diffusion limitation of the catalyst support according to aspects of the invention largely small, it is provided according to a further preferred embodiment of the catalyst according to aspects of the invention that the catalyst support has an average pore diameter of 7 nm to 30 nm, preferably of 9.5 nm to 20 nm and particularly preferably of 10.5 nm to 15 nm and most preferably of 11.5 to 13.5 nm. The average pore diameter is determined according to DIN 66134 (determination of the pore-size distribution and specific surface area of mesoporous solids by nitrogen sorption (process according to Barrett, Joyner and Halenda (BJH)).

According to a further preferred embodiment of the catalyst support according to aspects of the invention, it is provided that the catalyst support has a specific surface area of less than/equal to 180 $m^2/g$.

It has been established that, the smaller the specific surface area of a catalyst support according to aspects of the invention, the higher the alkenyl acetate selectivity of an alkenyl acetate catalyst prepared using the catalyst support according to aspects of the invention with a virtually constant activity of the catalyst. According to a particularly preferred embodiment of the catalyst support according to aspects of the invention, it is therefore provided that the catalyst support has a specific surface area of less than/equal to 180 m$^2$/g, preferably less than/equal to 160 m$^2$/g, preferably less than/equal to 140 m$^2$/g, further preferably less than/equal to 137 m$^2$/g, more preferably less than/equal to 135 m$^2$/g, still more preferably less than/equal to 133 m$^2$/g and particularly preferably less than/equal to 130 m$^2$/g. The specific surface area of the support according to aspects of the invention is determined according to DIN 66131 (determination of the specific surface area of solids by gas adsorption according to Brunauer, Emmett and Teller (BET)) by means of nitrogen.

According to aspects of the invention, it is furthermore preferred that the catalyst support has a specific surface area of 60 m$^2$/g to 180 m$^2$/g, preferably of 65 m$^2$/g to 160 m$^2$/g, preferably of 70 m$^2$/g to 150 m$^2$/g, further preferably of 75 m$^2$/g to 140 m$^2$/g, more preferably of 75 m$^2$/g to 130 m$^2$/g and most preferably of 80 m$^2$/g to 120 m$^2$/g.

The size of the specific surface area, of the average pore diameter, of the integral pore volume, etc. of the catalyst support depends in particular on the quality of the natural sheet silicate used, the acid-treatment method, i.e. for example the nature and the quantity, relative to the sheet silicate, and the concentration of the mineral acid used, the acid-treatment duration and temperature, on the moulding pressure and on the calcining duration and temperature and also the calcining atmosphere.

The catalyst support according to aspects of the invention has a relatively high stability. According to a further preferred embodiment of the catalyst support according to aspects of the invention, it is provided that the catalyst support has a hardness greater than/equal to 30 N, preferably a hardness of 50 N to 75 N and particularly preferably a hardness of 55 N to 70 N. The hardness (indentation hardness) is measured on spherical samples (diameter: 5 mm) by means of the 8M tablet-hardness testing machine from Dr. Schleuniger Pharmatron AG (Switzerland). Before measurement the samples are dried over a period of 2 h at a temperature of 130° C. The hardness is calculated as the average of 99 measurements. For the measurements the choosable parameters, named below, of the 8M tablet-hardness testing machine are set as follows:

Hardness (dimension): N
Distance from the sample: 5.00 mm
Time delay: 0.80 s
Feed type: 6 D
Speed: 0.60 mm/s According to aspects of the invention, it is preferred that the proportion of natural sheet silicate in the catalyst support according to aspects of the invention is more than/equal to 50 wt.-%, preferably 55 wt.-% to 99 wt.-%, preferably 60 wt.-% to 97 wt.-%, further preferably 65 wt.-% to 95 wt.-% and still further preferably 70 wt.-% to 90 wt.-%, relative to the weight of the catalyst support.

According to a further preferred embodiment of the catalyst support according to aspects of the invention it is provided that the catalyst support has an integral pore volume of 0.25 ml/g to 0.7 ml/g.

Compared with a catalyst support of the state of the art, which has been surface-doped with $ZrO_2$ by means of a zirconium salt solution, the catalyst support according to aspects of the invention has a relatively large pore volume, as, when $ZrO_2$ is introduced during the preparation of the catalyst support according to aspects of the invention, the pores of the support are not blocked. It was found that the alkenyl acetate selectivity of an alkenyl acetate catalyst prepared by means of the catalyst support according to aspects of the invention depends on the integral pore volume of the catalyst support. It is therefore preferred that the catalyst support has an integral pore volume of 0.25 ml/g to 0.7 ml/g, preferably 0.3 ml/g to 0.65 ml/g and preferably 0.30 ml/g to 0.50 ml/g. The integral pore volume is determined according to DIN 66134 (determination of the pore-size distribution and specific surface area of mesoporous solids by nitrogen sorption (process according to Barrett, Joyner and Halenda (BJH)).

According to a further preferred embodiment of the catalyst support according to aspects of the invention, it is provided that at least 80%, preferably at least 90%, preferably at least 98% and most preferably at least 99%, of the integral pore volume of the catalyst support is formed from mesopores and macropores. A reduced activity, effected by diffusion limitation, of an alkenyl acetate catalyst prepared by means of the catalyst support according to aspects of the invention, in particular a Pd/Au shell catalyst with relatively large shell thickness is thereby counteracted. By "micropores", "mesopores" and "macropores" are meant pores which have a diameter of less than 2 nm, a diameter of 2 nm to 50 nm and a diameter of more than 50 nm respectively. The volume proportion of the mesopores and macropores in the integral pore volume is ascertained using the pore-volume distribution of the catalyst support according to aspects of the invention, which is determined according to DIN 66134 (determination of the pore-size distribution and specific surface area of mesoporous solids by nitrogen sorption (process according to Barrett, Joyner and Halenda (BJH)).

According to a further preferred embodiment of the catalyst support according to aspects of the invention, it is provided that the proportion of the integral pore volume accounted for by pores of the support with a diameter of 6 nm to 50 nm is more than 66%, preferably 66% to 80% and particularly preferably 68% to 75%. The percentages are calculated from the pore-size distribution which is to be determined according to DIN 66134 (determination of the pore-size distribution and specific surface area of mesoporous solids by nitrogen sorption (process according to Barrett, Joyner and Halenda (BJH)).

According to a further preferred embodiment of the catalyst support according to aspects of the invention, it is provided that the catalyst support has a bulk density of more than/equal to 0.4 g/ml, preferably more than/equal to 0.45 g/ml, preferably more than/equal to 0.6 g/ml and particularly preferably a bulk density of 0.6 g/ml to 0.75 g/ml.

According to a further preferred embodiment of the catalyst support according to aspects of the invention, it is provided that the natural sheet silicate contained in the catalyst support has an $SiO_2$ content of at least 65 wt.-%, preferably at least 80 wt.-% and particularly preferably 85 wt.-% to 97 wt.-%. A high chemical resistance of the catalyst support according to aspects of the invention in the alkenyl acetate synthesis is thereby ensured.

In the gas-phase synthesis of an alkenyl acetate from acetic acid and ethene, a relatively low $Al_2O_3$ content in the natural sheet silicate is scarcely disadvantageous, whereas with high $Al_2O_3$ contents a marked reduction in the indentation hardness of the catalyst support must be expected. According to a preferred embodiment of the catalyst support according to aspects of the invention, the natural sheet silicate therefore contains less than 5 wt.-% $Al_2O_3$, preferably 0.1 wt.-% to 3 wt.-% and preferably 0.3 wt.-% to 2.50 wt.-%, relative to the weight of the natural sheet silicate contained in the support according to aspects of the invention.

According to a further preferred embodiment of the catalyst support according to aspects of the invention, it is provided that the catalyst support is formed as a shaped body.

In particular with regard to the preparation of shell catalysts it is favourable that the catalyst support according to aspects of the invention is formed as a shaped body. In principle the catalyst support can have any form known to a person skilled in the art to be suitable for the purpose according to aspects of the invention. For example the catalyst support according to aspects of the invention can be formed as a sphere, cylinder, perforated cylinder, trilobe, ring, star, torus or strand, preferably as a sphere, perforated cylinder, or trilobe.

According to a further preferred embodiment of the catalyst support according to aspects of the invention, it is provided that the catalyst support has a maximum size of 1 mm to 25 mm, preferably a maximum size of 3 mm to 15 mm.

According to a further preferred embodiment of the catalyst support according to aspects of the invention, it is provided that the catalyst support is formed as a sphere.

According to a further preferred embodiment of the catalyst support according to aspects of the invention, it is provided that the sphere has a diameter of 2 mm to 10 mm, preferably a diameter of 4 mm to 8 mm.

According to a further embodiment of the catalyst support according to aspects of the invention, it is provided that the catalyst support is doped with at least one oxide of a metal selected from the group consisting of Hf, Ti, Nb, Ta, W, Mg, Re, Y and Fe, preferably with $HfO_2$. The activity of an alkenyl acetate catalyst prepared using the catalyst support according to aspects of the invention can be increased by the doping.

It can be provided that the catalyst support is doped with $Y_2O_3$ and/or $HfO_2$. A high level of stabilization of the tetragonal modification of the $ZrO_2$ accompanied by a high resistance of the $ZrO_2$ to acetic acid is ensured by the $Y_2O_3$ doping. The $HfO_2$ doping effects an increase in the activity of a corresponding alkenyl acetate catalyst. The $ZrO_2$ itself can be doped with $Y_2O_3$, $HfO_2$ or $HfO_2$ and $Y_2O_3$. The proportion of $Y_2O_3$ in the doped $ZrO_2$ can amount to 1 wt.-% to 8 wt.-%, preferably 3 wt.-% to 5 wt.-%, and the proportion of $HfO_2$ in the $ZrO_2$ to 0.1 wt.-% to 5 wt.-%, preferably 1 wt.-% to 2 wt.-%. According to aspects of the invention it is however particularly preferred that the $ZrO_2$ contained in the catalyst support is free of doping oxide stabilizing the tetragonal phase, in particular free of $Y_2O_3$. Even without doping with a metal oxide stabilizing the tetragonal phase, the tetragonal $ZrO_2$ in the support according to aspects of the invention is stable.

It is provided according to a further preferred embodiment of the catalyst support according to aspects of the invention that the proportion of doping oxide in the catalyst support is between 1 wt.-% and 20 wt.-%, preferably 2 wt.-% to 10 wt.-%, and preferably 3 wt.-% to 8 wt.-%, relative to the weight of the catalyst support. The doping can take place for example by surface doping, such as is known from the state of the art, or the metal oxide(s) can be incorporated into the matrix of the catalyst support.

According to a further preferred embodiment, it can be provided that the water absorbency of the catalyst support is 40% to 75%, preferably 50% to 70%, calculated as the weight increase due to water absorption. The absorbency is determined by steeping 10 g of the support sample in deionized water for 30 min until gas bubbles no longer escape from the support sample. The excess water is then decanted and the steeped sample blotted with a cotton towel to remove adhering moisture from the sample. The water-laden support is then weighed and the absorbency calculated as follows:

(amount weighed out (g)−amount weighed in (g))×
10=water absorbency (%)

The present invention also relates to a process, in particular for the preparation of a catalyst support according to aspects of the invention, comprising the preparation of a mixture, comprising a powdery natural sheet silicate and powdery zirconium hydroxide;

the calcining of the mixture at a temperature above 620° C.

It was found that a catalyst support prepared by means of the process according to aspects of the invention has a relatively low solubility in acetic acid of the $ZrO_2$ contained in the catalyst (Zr release), with the result that relatively little $ZrO_2$ needs to be contained in the catalyst support in order to maintain the increased activity of a corresponding alkenyl acetate catalyst over a relatively long period. In boiling acetic acid the catalyst supports prepared by means of the process according to aspects of the invention have a solubility in acetic acid of the $ZrO_2$ contained in the catalyst support of less than 0.06 wt.-% to 0.0001 wt.-%, relative to the weight of the $ZrO_2$ contained in the catalyst support. The solubility in acetic acid of the $ZrO_2$ contained in the catalyst support is determined as already explained above.

It was also found that 50% to 100% of the X-ray diffraction active $ZrO_2$ contained in a catalyst support prepared by means of the process according to aspects of the invention is present in the tetragonal modification.

According to a further preferred embodiment of the process according to aspects of the invention it is provided that the natural sheet silicate is an acid-activated natural sheet silicate.

In the process according to aspects of the invention a mixture is prepared, which contains a powdery natural sheet silicate and powdery zirconium hydroxide. The natural sheet silicate may be an acid-activated natural sheet silicate. Acid-activated natural sheet silicates are known in the state of the art (cf. Römpp Lexikon Chemie, 10$^{th}$ edition, Georg Thieme Verlag, headword "Bentonite"). They are prepared by treating a natural sheet silicate with a mineral acid, preferably with hydrochloric acid.

According to a further preferred embodiment of the process according to aspects of the invention it is provided that the powdery zirconium hydroxide has a $d_{10}$ value between 0.1 µm and 3.0 µm, a $d_{50}$ value between 0.5 µm and 10 µm and a $d_{90}$ value between 1.0 µm and 20 µm.

It was found that the mechanical stability of a catalyst support prepared by means of the process according to aspects of the invention depends on the particle-size distribution of the zirconium hydroxide used. If a powdery zirconium hydroxide is used in the process according to aspects of the invention, with a $d_{10}$ value between 0.1 µm and 3.0 µm, with a $d_{50}$ value between 0.5 µm and 10 µm and with a $d_{90}$ value between 1.0 µm and 20 µm, catalyst supports are obtained, which—preferably formed as 5 mm spheres—are characterized by an extremely high mechanical stability of up to more than 55 N. Overall, however, as the $ZrO_2$ content in the catalyst support increases, lower mechanical stabilities can be determined. In the case of the use of shaped bodies of a size greater than 5 mm or of cylindrical shaped bodies, mechanical stabilities of more than 90 N, preferably more than 120 N can also be obtained.

According to a further preferred embodiment of the process according to aspects of the invention it is provided that the average particle diameter $d_{50}$ of the powdery sheet silicate used is greater than that of the zirconium hydroxide used.

It was found that the mechanical stability of a catalyst support prepared by means of the process according to aspects of the invention is greater if the average particle diameter $d_{50}$ of the natural sheet silicate used in the process according to aspects of the invention is greater than the average particle diameter $d_{50}$ of the zirconium hydroxide used, at least the majority of which is converted into the tetragonal $ZrO_2$ during the process according to aspects of the invention. According to a further preferred embodiment of the process according to aspects of the invention it is therefore provided that the average particle diameter of the sheet silicate is greater than that of the zirconium hydroxide.

The average particle diameter $d_{50}$ of the raw materials (and also the $d_{10}$ and $d_{90}$ value) is determined by means of lasers on a Master Sizer (Malvern Instruments, GB) according to the standard method (other measuring apparatus includes e.g. Horiba LA 500 (Horiba Ltd., JP) or Helos (Sympatec GmbH, DE), which use the same measurement principle). For this, the $Zr(OH)_4$ or sheet silicate samples are introduced into a vessel with water, and this vessel is then placed in the measuring apparatus. The measuring procedure is automatic and also includes the mathematical determination of the $d_{50}$ value. The $d_{50}$ value is by definition determined from the (relative) cumulative curve of the particle-size distribution, wherein the intersection point of the 50 wt.-% y-coordinate with the cumulative curve on the x-axis provides the desired $d_{50}$ value.

According to a further preferred embodiment of the process according to aspects of the invention it is provided that the calcining is carried out at a temperature of 620° C. to 800° C.

It was found that a catalyst support prepared by means of the process according to aspects of the invention is characterized by a particularly low solubility of $ZrO_2$ in acetic acid and thus by a low loss of Zr in the alkenyl acetate preparation process, if the mixture comprising the natural sheet silicate and zirconium hydroxide is calcined at a temperature of 620° C. to 800° C., preferably at a temperature of 630° C. to 750° C., preferably at a temperature of 650° C. to 700° C. The zirconium hydroxide is converted into $ZrO_2$ during the calcining of the mixture.

It was also found that the yield of zirconium, expressed as $ZrO_2$ yield, in the catalyst support is particularly high due to calcining in the temperature range described above. The $ZrO_2$ yield relates to the $ZrO_2$ content of the catalyst support after the first calcining and after treatment with mineral acid. The $ZrO_2$ yield is determined as follows:

$ZrO_2$ yield=Zr content in the catalyst support (converted into $ZrO_2$) after the mineral acid treatment*quantity of catalyst support obtained/quantity of Zr used (converted to $ZrO_2$). The $ZrO_2$ yield of a catalyst support prepared by means of the process according to aspects of the invention amounts to at least 85%, preferably at least 95% and most preferably at least 97%.

According to a further preferred embodiment of the process according to aspects of the invention, it is provided that the calcining is carried out over a period of 3 h to 24 h.

In order to ensure a largely complete conversion of the zirconium hydroxide used in the process according to aspects of the invention into $ZrO_2$ and a largely complete formation of the tetragonal modification of the $ZrO_2$, the mixture to be used in the process according to aspects of the invention is calcined over a period of at least 3 h, preferably over a period of 3 h to 24 h and particularly preferably over a period of 5 h to 10 h.

According to a further preferred embodiment of the process according to aspects of the invention it is provided that the mixture is moulded into a shaped body before the calcining. The mixture can be moulded into shaped bodies by means of any process and any device known to a person skilled in the art to be suitable for the purpose according to aspects of the invention. The moulding of shaped bodies can thus for example be carried out by means of a tablet press.

According to a further preferred embodiment of the process according to aspects of the invention, it is provided that the mixture is treated with a mineral acid after the calcining.

In order to clean the solid mixture obtained after the calcining and in particular to remove the majority of residual $ZrO_2$ which is soluble in acetic acid, it is provided according to a further preferred embodiment of the process according to aspects of the invention that the mixture is treated with a mineral acid after the calcining. There can be used as mineral acids any mineral acids which are known to a person skilled in the art to be suitable for the purpose according to aspects of the invention. Examples of preferred mineral acids are hydrochloric acid, nitric acid, sulphuric acid and phosphoric acid, preferably in each case with a pH value of less than pH=2, more preferably with a pH value of less than pH=1.

According to a further preferred embodiment of the process according to aspects of the invention, it is provided that the mineral acid is hydrochloric acid.

It was found that the calcined mixture resulting from the process according to aspects of the invention can be particularly effectively purified with hydrochloric acid, for example with 10-30% hydrochloric acid. According to a further preferred embodiment of the process according to aspects of the invention, it is accordingly provided that the mineral acid is hydrochloric acid.

According to a further preferred embodiment of the process according to aspects of the invention, it is provided that the calcined mixture is washed after the treatment with mineral acid.

In order, after the treatment with mineral acid, to remove acid residues and components, dissolved out of the natural sheet silicate by the mineral acid, from the calcined mixture, the calcined mixture is washed after the treatment with acid, preferably with water.

According to a further preferred embodiment of the process according to aspects of the invention, it is provided that the calcined mixture is again calcined after the washing.

According to a further preferred embodiment of the process according to aspects of the invention it is provided that the calcined mixture is again calcined after the washing, preferably at a temperature of 400° C. to 800° C., preferably at a temperature of 500° C. to 600° C. The second calcining step has the effect of further reducing the Zr release of the material.

The present invention also relates to a catalyst support which can be obtained according to the process according to aspects of the invention.

According to a preferred embodiment of the catalyst support which can be obtained by means of the process according to aspects of the invention, it is provided that the catalyst support comprises a natural sheet silicate and $ZrO_2$ in the tetragonal modification, wherein it is further preferred that at least 50 wt.-% of the $ZrO_2$ contained in the catalyst support is present in the tetragonal modification, preferably 90 wt.-% and particularly preferably 95 wt.-% to 100 wt.-%.

The present invention furthermore relates to a catalyst support with an XRD spectrum according to FIG. 2.

The present invention furthermore relates to the use of the first catalyst support according to aspects of the invention and of the second catalyst support according to aspects of the invention and of the catalyst support which can be obtained by means of the process according to aspects of the invention and of the catalyst support according to aspects of the invention characterized by the XRD spectrum of FIG. 2 in the preparation of a catalyst for the synthesis of alkenyl acetates.

According to a preferred embodiment of the use according to aspects of the invention, it is provided that the catalyst is a shell catalyst in the shell of which Pd and Au of the oxidation number 0 are contained.

BRIEF DESCRIPTION OF THE DRAWING

The examples below serve, in conjunction with the drawing, to describe the invention. There are shown in:

FIG. 3: Section of an EDX photograph of a second catalyst support according to aspects of the invention according to example 1a;

EXAMPLE 1

500.0 g of an acid-treated dried powdery bentonite (acid-activated bentonite) with the main constituent montmorillonite as sheet silicate was mixed with a quantity of $Zr(OH)_4$ customary in the trade corresponding to 61.875 g of $ZrO_2$, with a $d_{10}$ value of approx. 1 μm, a $d_{50}$ value of approx. 5 μm and with a $d_{90}$ value of 7 μm, and also with 10 g of a customary organic binder/pore-forming agent.

Water was added to the resultant mixture and it was processed by means of a mixer into a dough from which spherical shaped bodies (d=5 mm) were prepared under pressure by means of a tablet press. For hardening, the spheres were dried and calcined at a temperature of 650° C. over a period of 5 h. After the calcining, the shaped bodies were treated with 20% hydrochloric acid over a period of 30 h, washed with plenty of water and calcined at a temperature of 600° C. over a period of 5 h. The thus-obtained shaped bodies have the characteristics listed in Table 1:

TABLE 1

| Geometric form | Sphere |
|---|---|
| Diameter | 5 mm |
| Moisture content | 0.5 wt.-% |
| Compressive strength | 60 N |
| Bulk density | 607 g/l |
| Water absorbency | 58% |
| Specific surface area (BET) | 133 m²/g |
| $SiO_2$ content | 81.6 wt.-% |
| $ZrO_2$ content | 12.8 wt.-% |
| $ZrO_2$ yield | 98% |

TABLE 1-continued

| Proportion of tetragonal $ZrO_2$ (determined according to XRD diffractogram) | >90 wt.-% |
|---|---|
| $Al_2O_3$ content | 2.5 wt.-% |
| Loss on ignition 1000° C. | 1.5 wt.-% |
| Acidity | 62 μval |
| Integral pore volume | 0.377 ml/g |
| Zr release | 0.001 wt.-% |
| Average pore diameter (according to BJH) (4V/A) | 10.5 nm |
| Proportion of the integral pore volume accounted for by micropores | <1% |
| Proportion of the integral pore volume accounted for by pores with a diameter of 2.0 nm to 6 nm | 14.3% |
| Proportion of the integral pore volume accounted for by pores with a diameter of 6.0 nm to 50 nm | 70.2% |
| Proportion of the integral pore volume accounted for by pores with a diameter of 2.0 nm to 50 nm | 84.5% |
| Average particle size $d_{50}$ of the $ZrO_2$ (determined from EDX mapping) | 20 μm |

Figure 1:
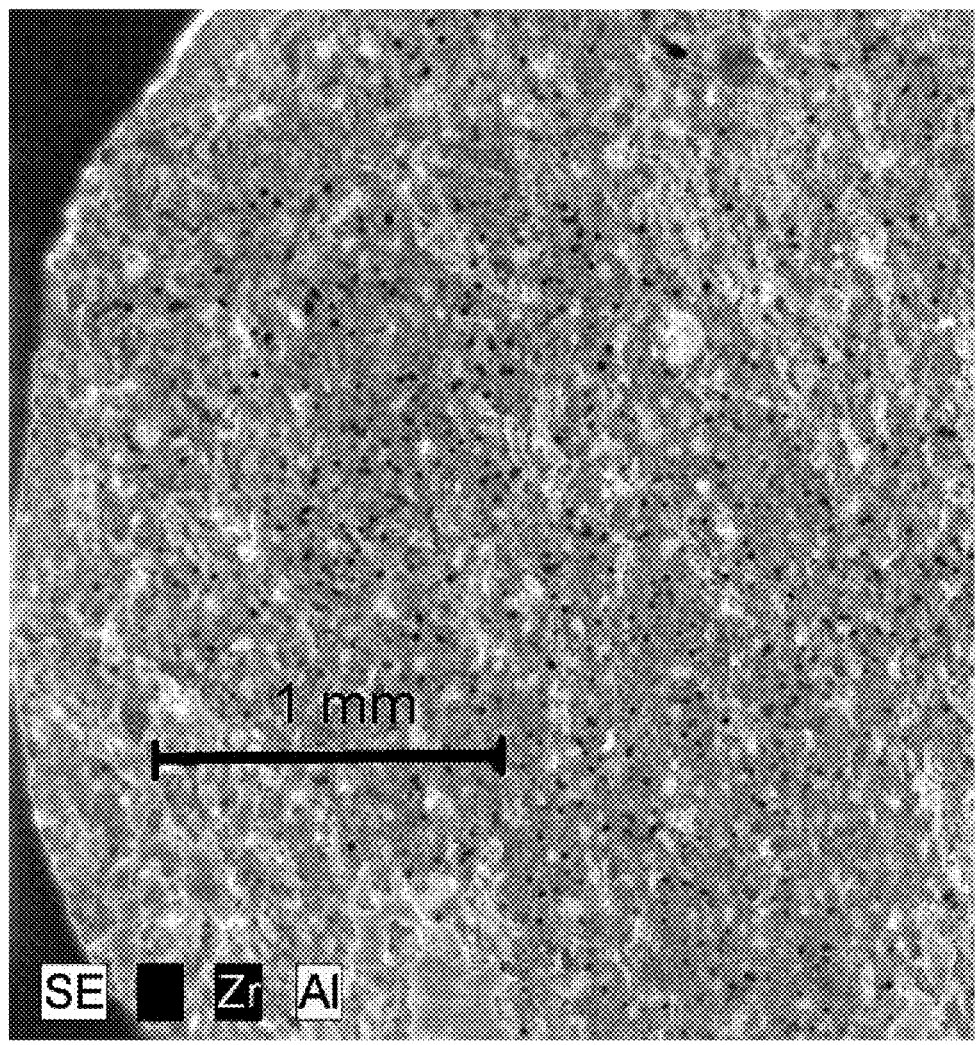
FIG. 1: Section of an EDX photograph of a first catalyst support according to aspects of the invention according to example 1.

A catalyst support according to example 1 was halved and the cut surface of one half measured by means of energy-dispersive X-ray spectroscopy (EDX). FIG. 1 shows a section of the EDX photograph. The homogeneous statistical distribution of the $ZrO_2$ particles (dark spots) in the support matrix is clearly visible.

Figure 2:
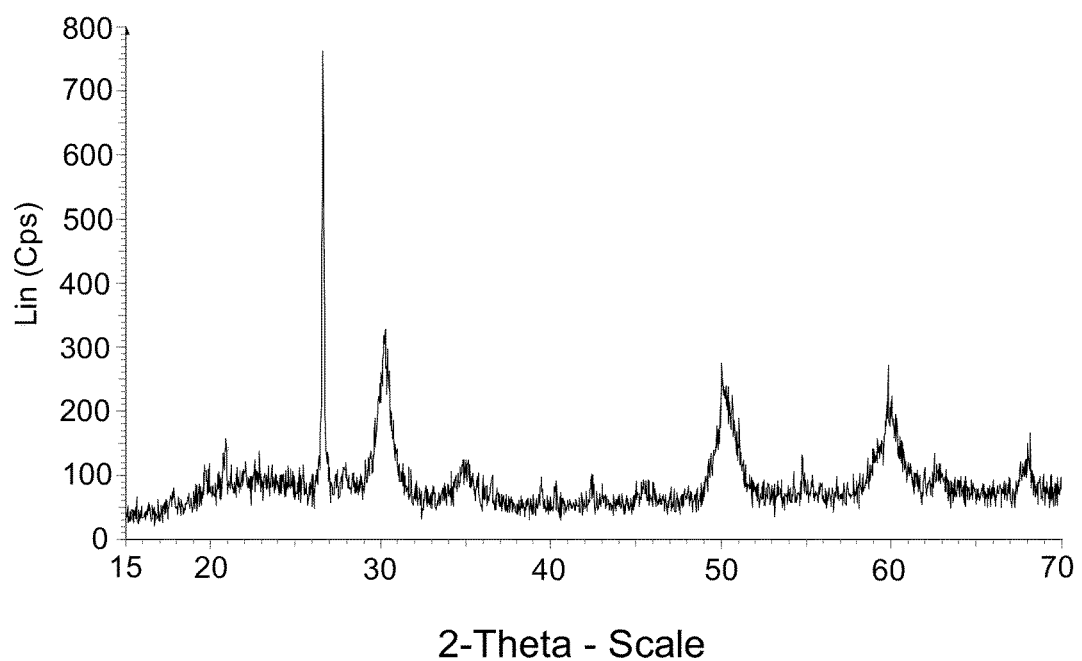
FIG. 2: XRD spectrum of the first catalyst support according to aspects of the invention.

A catalyst support according to example 1 was ground to a powder and measured by X-ray diffractometry. The resulting XRD spectrum is shown in FIG. 2. Only signals from tetragonal $ZrO_2$ can be identified in the XRD spectrum. No monoclinic or cubic $ZrO_2$ can be identified in the spectrum.

EXAMPLE 1a

Catalyst supports were prepared analogously to example 1, differing only in that a quantity of $Zr(OH)_4$ customary in the trade corresponding to 132 g of $ZrO_2$ was used. The thus-obtained shaped bodies have the characteristics listed in Table 1a:

TABLE 1a

| Geometric form | Sphere |
|---|---|
| Diameter | 5 mm |
| Moisture content | 0.4 wt.-% |
| Compressive strength | 33 N |
| Bulk density | 580 g/l |
| Water absorbency | 67.1% |
| Specific surface area (BET) | 132 m²/g |
| $SiO_2$ content | 69.5 wt.-% |
| $ZrO_2$ content | 24.5 wt.-% |
| $ZrO_2$ yield | 99% |
| Proportion of tetragonal $ZrO_2$ (determined according to XRD diffractogram) | >90 wt.-% |
| $Al_2O_3$ content | 1.8 wt.-% |
| Loss on ignition 1000° C. | 1.6 wt.-% |
| Acidity | 23 μval |
| Integral pore volume | 0.4 ml/g |
| Zr release | 0.001 wt.-% |
| Average pore diameter (according to BJH) (4V/A) | 11 nm |
| Proportion of the integral pore volume accounted for by micropores | <1% |
| Proportion of the integral pore volume accounted for by pores with a diameter of 2.0 nm to 6 nm | 13.6% |
| Proportion of the integral pore volume accounted for by pores with a diameter of 6.0 nm to 50 nm | 71.7% |
| Proportion of the integral pore volume accounted for by pores with a diameter of 2.0 nm to 50 nm | 85.3% |

TABLE 1a-continued

| | |
|---|---|
| Average particle size $d_{50}$ of the $ZrO_2$ (determined from EDX mapping) | 20 μm |

Figure 3:
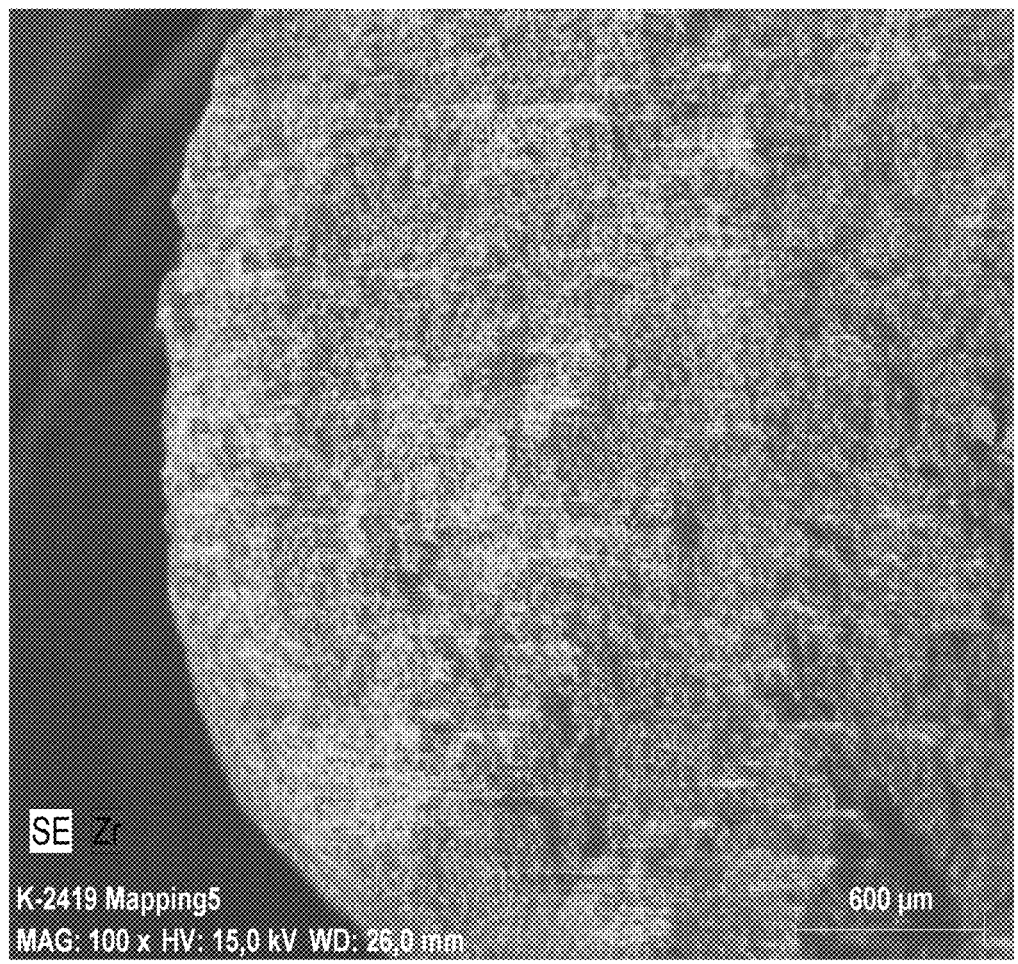

A catalyst support according to example 1a was halved and the cut surface of one half measured by means of EDX. FIG. 3 shows a section of the EDX photograph. The homogeneous statistical distribution of the $ZrO_2$ particles (light spots) in the support matrix is clearly visible.

EXAMPLE 1b

Catalyst supports were prepared analogously to example 1, differing only in that the catalyst supports were treated with hydrochloric acid for a period of only 8 h. The thus-obtained shaped bodies have the selected characteristics listed in Table 1b:

TABLE 1b

| | |
|---|---|
| $ZrO_2$ content | 12.6 wt.-% |
| Proportion of tetragonal $ZrO_2$ (determined according to XRD diffractogram) | >90 wt.-% |
| Zr release | 0.002 wt.-% |
| Average pore diameter (according to BJH) (4V/A) | 7.7 nm |
| $ZrO_2$ yield | 98.5% |

EXAMPLE 2

Catalyst supports were prepared analogously to example 1, differing in that the first calcining was carried out after the shaping at only 550° C. The thus-obtained shaped bodies have the selected characteristics listed in Table 2:

TABLE 2

| | |
|---|---|
| $ZrO_2$ content | 9.6 wt.-% |
| Zr release | 0.001 wt.-% |
| Average pore diameter (according to BJH) (4V/A) | 11 nm |
| $ZrO_2$ yield | 76% |

The thus-obtained support has a $ZrO_2$ yield of only 76% and a $ZrO_2$ content of 9.6 wt.-%.

EXAMPLE 3

Comparison Example

A catalyst support commercially available from Süd-Chemie AG, Munich, Germany with the trade name "KA-160" for example has the characteristics listed in Table 3:

TABLE 3

| | |
|---|---|
| Geometric form | Sphere |
| Diameter | 5 mm |
| Water absorbency | 66.4% |
| Specific surface area (BET) | 161 m$^2$/g |
| $SiO_2$ content | 91.8 wt.-% |
| $Al_2O_3$ content | 3.6 wt.-% |
| Average pore diameter (according to BJH) (4V/A) | 10.3 nm |
| Integral pore volume | 0.436 ml/g |
| Proportion of the integral pore volume accounted for by pores with a diameter of 2.0 nm to 6 nm | 11.0% |
| Proportion of the integral pore volume accounted for by pores with a diameter of 6.0 nm to 50 nm | 71.6% |
| Proportion of the integral pore volume accounted for by pores with a diameter of 2.0 nm to 50 nm | 82.7% |

EXAMPLE 4

Comparison Example (cf. U.S. Pat. No. 5,808,136) 74.6 g of an aqueous solution of zirconyl acetate ($ZrO(OAc)_2$), which had a Zr content of 15.5 wt.-% was diluted with approx. 8.5 ml of water. 100 g of the catalyst support KA-160 from Süd-Chemie AG according to example 3 was impregnated with the above solution. The impregnated support was dried and calcined at 500° C. The resulting catalyst support had a zirconium content of approx. 10 wt.-% (calculated as corresponding to 13.53 wt.-% $ZrO_2$). Further characteristics of the support are listed in Table 4:

TABLE 4

| | |
|---|---|
| Geometric form | Sphere |
| Diameter | 5 mm |
| Water absorbency | 49.1% |
| Specific surface area (BET) | 134 m$^2$/g |
| Zr content* | 10 wt.-% |
| $SiO_2$ content | 80.9 wt.-% |
| Zr release* | 0.129 wt.-% |
| $Al_2O_3$ content | 3 wt.-% |
| Average pore diameter (according to BJH) (4V/A) | 9.1 nm |
| Integral pore volume | 0.332 ml/g |
| Proportion of the integral pore volume accounted for by pores with a diameter of 2.0 nm to 6 nm | 20.0% |
| Proportion of the integral pore volume accounted for by pores with a diameter of 6.0 nm to 50 nm | 65.1% |
| Proportion of the integral pore volume accounted for by pores with a diameter of 2.0 nm to 50 nm | 85.2% |

Figure 4:
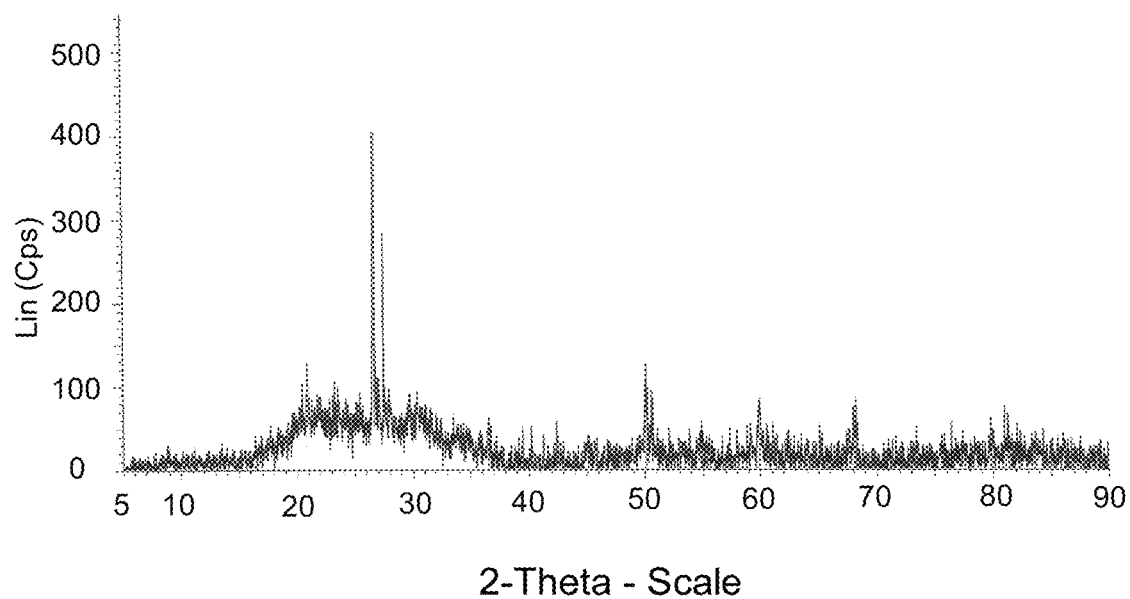
FIG. 4: XRD spectrum of a catalyst support of the state of the art according to example 4.

*For calculation purposes, the $ZrO_2$ content of 13.53 wt.-% ascertained by calculation from the Zr content is used FIG. 4 shows the XRD spectrum of a catalyst support prepared according to example 4. It is clear from the spectrum that the Zr in the support is not present in an X-ray diffraction active oxide form.

Figure 5:
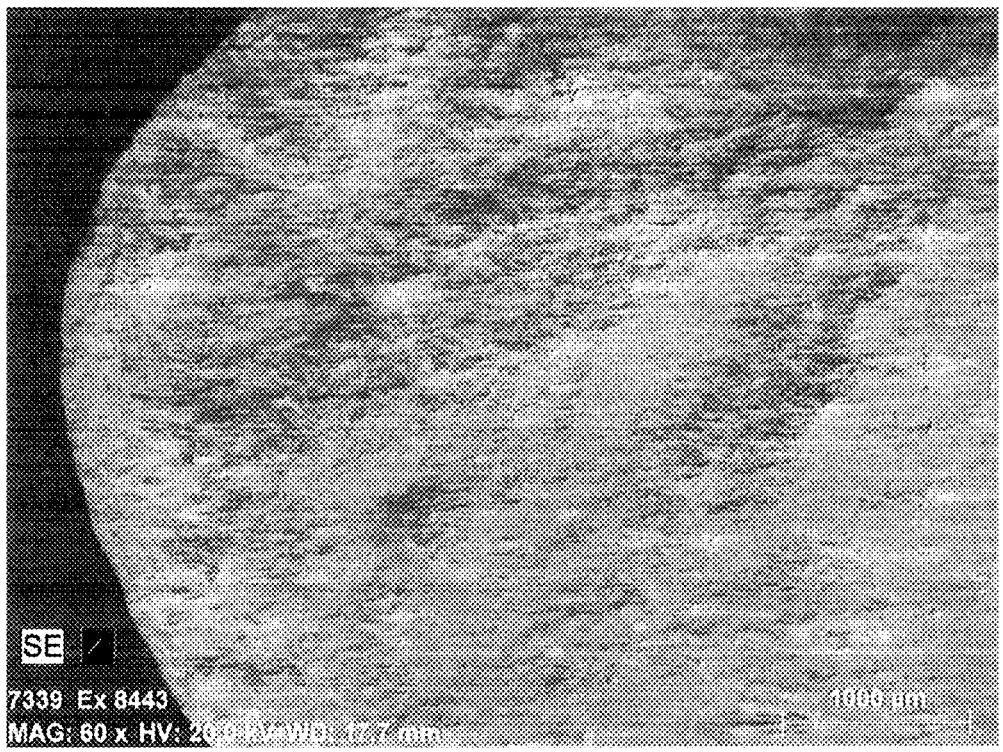
FIG. 5: Section of an EDX photograph of the catalyst support according to example 4.

A catalyst support according to example 4 was halved and the cut surface of one half measured by means of EDX. FIG. 5 shows a section of the EDX photograph. No discrete zirconium-containing particles are visible.

EXAMPLE 5

Comparison Example

Catalyst supports were prepared analogously to example 1, differing only in that 57.8 g of a 20% zirconyl nitrate solution diluted with 19.7 ml of water was used. Characteristics of the thus-obtained support are listed in Table 5:

TABLE 5

| | |
|---|---|
| Zr content* | 2.6 wt.-% |
| Zr release* | 0.06 wt.-% |

*For calculation purposes, the $ZrO_2$ content of 3.51 wt.-% ascertained from the Zr content is used.

Note:
On drying, enriched zirconyl nitrate separates from the surface resulting in a high loss of zirconium.

Comparative Overview

In Table 6 the average pore diameter, the integral pore volume and proportions of particular pore sizes in the integral pore volume of examples 3, 4, 1 and 1a are compared.

TABLE 6

| Example | 3 | 4 | 1 | 1a |
|---|---|---|---|---|
| Average pore diameter (according to BJH) (4V/A) | 10.3 nm | 9.1 nm | 10.5 nm | 11.0 nm |
| Integral pore volume | 0.436 ml/g | 0.332 ml/g | 0.377 ml/g | 0.40 ml/g |
| Proportion of the integral pore volume accounted for by pores with a diameter of 2.0 nm to 6 nm | 11.0% | 20.0% | 14.3% | 13.6% |
| Proportion of the integral pore volume accounted for by pores with a diameter of 6.0 nm to 50 nm | 71.6% | 65.1% | 70.2% | 71.7% |
| Proportion of the integral pore volume accounted for by pores with a diameter of 2.0 nm to 50 nm | 82.7% | 85.2% | 84.5% | 85.3% |

The subsequent impregnation of the commercial KA-160 support of example 3 with Zr according to example 4 leads to a significant reduction in the integral pore volume and to a narrowing of pores. The proportion of pores of 2 nm to 6 nm increases significantly, at the expense of the mesopores greater than 6 nm. However, compared with the catalyst support of example 3, the catalyst support prepared according to aspects of the invention and according to the process according to aspects of the invention according to examples 1 and 1a, despite doping with 12.8 wt.-% or 24.5 wt.-% $ZrO_2$, has an overall higher or at least comparable proportion of mesopores in the case of an increased average pore diameter.

The Zr releases of examples 1, 1a, 1b, 2, 4 and 5 are compared in Table 7.

TABLE 7

| Example | 1 | 1a | 1b | 2 | 4 | 5 |
|---|---|---|---|---|---|---|
| Zr release [wt.-%] | 0.001 | 0.001 | 0.002 | 0.001 | 0.129 | 0.060 |

The catalyst supports of examples 1, 1a and 1b and 2 have a clearly reduced Zr release compared with examples 4 and 5.

The invention claimed is:

1. An open-pore catalyst support, comprising a material that comprises a natural sheet silicate and $ZrO_2$ in the tetragonal crystalline phase, wherein the catalyst support in boiling acetic add releases less than 0.06 wt.-%, Zr calculated as $ZrO_2$, relative to the weight of the $ZrO_2$ contained in the catalyst support, and wherein the $ZrO_2$ is contained in the catalyst support in a proportion of 1 wt.-% to 30 wt.-%.

2. An open-pore catalyst support material comprising a natural sheet silicate and $ZrO_2$, wherein the catalyst support in boiling acetic add releases less than 0.06 wt.-% Zr calculated as $ZrO_2$, relative to the weight of the $ZrO_2$ contained in the catalyst support, and wherein the $ZrO_2$ is contained in the catalyst support in a proportion of 1 wt.-% to 30 wt.-%.

3. The catalyst support of claim 1, wherein at least 50 wt.-% of the $ZrO_2$ contained in the catalyst support is present in the tetragonal crystalline phase.

4. The catalyst support of claim 1, wherein the $ZrO_2$ is present in particulate form.

5. The catalyst support of claim 1, wherein the $ZrO_2$ is contained evenly distributed in the material.

6. The catalyst support of claim 4, wherein the $ZrO_2$ particles are evenly distributed over the cross-section of the support and wherein the support is essentially free of a percolation network of $ZrO_2$ particles.

7. The catalyst support of claim 1, wherein the natural sheet silicate is an acid-activated sheet silicate.

8. The catalyst support of claim 1, wherein the catalyst support has an acidity of 1 µval/g to 150 µval/g.

9. The catalyst support of claim 1, wherein the catalyst support has an average pore diameter of 7 nm to 30 nm.

10. The catalyst support of claim 1, wherein the catalyst support has a specific surface area of less than/equal to 180 $m^2/g$.

11. The catalyst support of claim 1, wherein the catalyst support has a specific surface area of 180 $m^2/g$ to 60 $m^2/g$.

12. The catalyst support of claim 1, wherein the catalyst support has a hardness greater than/equal to 30 N.

13. The catalyst support of claim 1, wherein the proportion of natural sheet silicate in the catalyst support is at least 50 wt.-%, relative to the weight of the catalyst support.

14. The catalyst support of claim 1, wherein the catalyst support has an integral pore volume of 0.25 ml/g to 0.7 ml/g.

15. The catalyst support of claim 1, wherein at least 80% of the integral pore volume of the catalyst support is formed from mesopores and macropores.

16. The catalyst support of claim 1, wherein the catalyst support has a bulk density of more than 0.45 g/ml.

17. The catalyst support of claim 1, wherein the natural sheet silicate contained in the catalyst support has an $SiO_2$ content of at least 65 wt.-%.

18. The catalyst support of claim 1, wherein the natural sheet silicate contained in the support contains less than 5 wt.-% $Al_2O_3$.

19. The catalyst support of claim 1, wherein the catalyst support is formed as a shaped body.

20. The catalyst support of claim 1, wherein the catalyst support has a maximum size of 1 mm to 25 mm.

21. The catalyst support of claim 19 formed as a sphere.

22. The catalyst support of claim 21, wherein the sphere has a diameter of 2 mm to 10 mm.

23. The catalyst support of claim 1, wherein the catalyst support is doped with at least one oxide of a metal selected from the group consisting of Hf, Ti, Nb, Ta, W, Mg, Re, Y and Fe.

24. The catalyst support of claim 23, wherein the proportion of doping oxide in the catalyst support is 1 wt.-% to 20 wt.-%.

25. The catalyst support material of claim 2, wherein the $ZrO_2$ is present in particulate form.

26. The catalyst support material of claim 2, wherein the $ZrO_2$ is contained evenly distributed in the material.

27. The catalyst support material of claim 25, wherein the $ZrO_2$ particles are evenly distributed over the cross-section of the support material and wherein the support material is essentially free of a percolation network of $ZrO_2$ particles.

28. The catalyst support material of claim 2, wherein the natural sheet silicate is an acid-activated sheet silicate.

29. The catalyst support of claim 2, wherein the catalyst support has an acidity of 1 µval/g to 150 µval/g.

30. The catalyst support material of claim 2, wherein the catalyst support material has an average pore diameter of 7 nm to 30 nm.

31. The catalyst support material of claim 2, wherein the catalyst support material has a specific surface area of less than/equal to 180 m²/g.

32. The catalyst support material of claim 2, wherein the catalyst support material has a specific surface area of 180 m²/g to 60 m²/g.

33. The catalyst support material of claim 2, wherein the catalyst support material has a hardness greater than/equal to 30 N.

34. The catalyst support material of claim 2, wherein the proportion of natural sheet silicate in the catalyst support material is at least 50 wt.-%, relative to the weight of the catalyst support.

35. The catalyst support material of claim 2, wherein the catalyst support material has an integral pore volume of 0.25 ml/g to 0.7 ml/g.

36. The catalyst support material of claim 2, wherein at least 80% of the integral pore volume of the catalyst support material is formed from mesopores and macropores.

37. The catalyst support material of claim 2, wherein the catalyst support material has a bulk density of more than 0.45 g/ml.

38. The catalyst support material of claim 2, wherein the natural sheet silicate contained in the catalyst support has an $SiO_2$ content of at least 65 wt.-%.

39. The catalyst support material of claim 2, wherein the natural sheet silicate contained in the support contains less than 5 wt.-% $Al_2O_3$.

40. The catalyst support material of claim 2, wherein the catalyst support material is formed as a shaped body.

41. The catalyst support material of claim 2, wherein the catalyst support material has a maximum size of 1 mm to 25 mm.

42. The catalyst support of claim 41 formed as a sphere.

43. The catalyst support of claim 42, wherein the sphere has a diameter of 2 mm to 10 mm.

44. The catalyst support material of claim 2, wherein the catalyst support material is doped with at least one oxide of a metal selected from the group consisting of Hf, Ti, Nb, Ta, W, Mg, Re, Y and Fe.

45. The catalyst support of claim 44, wherein the proportion of doping oxide in the catalyst support material is 1 wt.-% to 20 wt.-%.

* * * * *